United States Patent
Corbel

(12) 
(10) Patent No.: US 8,891,518 B2
(45) Date of Patent: Nov. 18, 2014

(54) ROUTING DEVICE AND METHOD OF TRANSLATING ADDRESSES IN CASCADE IN A NETWORK

(75) Inventor: Régis Corbel, Lannion (FR)

(73) Assignee: Orange, Paris (FR)

( * ) Notice: Subject to any disclaimer, the term of this patent is extended or adjusted under 35 U.S.C. 154(b) by 293 days.

(21) Appl. No.: 12/571,023

(22) Filed: Sep. 30, 2009

(65) Prior Publication Data

US 2010/0080240 A1 Apr. 1, 2010

(30) Foreign Application Priority Data

Sep. 30, 2008 (FR) ...................... 08 56543

(51) Int. Cl.
| | | |
|---|---|---|
| H04L 12/50 | (2006.01) | |
| H04Q 11/00 | (2006.01) | |
| H04L 12/28 | (2006.01) | |
| H04J 3/16 | (2006.01) | |
| H04J 3/22 | (2006.01) | |
| G06F 15/16 | (2006.01) | |
| G06F 15/173 | (2006.01) | |
| G06F 9/00 | (2006.01) | |
| G06F 17/00 | (2006.01) | |
| G06F 9/26 | (2006.01) | |
| G06F 9/34 | (2006.01) | |
| H04L 29/12 | (2006.01) | |

(52) U.S. Cl.
CPC ......... H04L 61/256 (2013.01); H04L 29/1249 (2013.01)
USPC ........... 370/388; 370/392; 370/401; 370/465; 709/203; 709/238; 709/249; 726/12; 711/202

(58) Field of Classification Search
USPC .......... 370/388, 392, 401, 465; 709/203, 238, 709/249; 726/12; 711/202
See application file for complete search history.

(56) References Cited

U.S. PATENT DOCUMENTS

| 8,139,572 | B1 * | 3/2012 | Distler et al. ................. 370/389 |
| 2003/0009561 | A1 * | 1/2003 | Sollee ........................... 709/227 |
| 2004/0136356 | A1 * | 7/2004 | Kuo et al. ..................... 370/351 |
| 2004/0139227 | A1 * | 7/2004 | Takeda .......................... 709/245 |
| 2005/0021841 | A1 * | 1/2005 | Yoshimoto .................... 709/238 |
| 2005/0105543 | A1 * | 5/2005 | Ikenaga et al. ................ 370/428 |
| 2005/0188092 | A1 * | 8/2005 | Short et al. .................... 709/227 |
| 2005/0259637 | A1 * | 11/2005 | Chu et al. ...................... 370/352 |
| 2006/0230126 | A1 * | 10/2006 | Bhogal et al. ................. 709/220 |
| 2007/0076729 | A1 * | 4/2007 | Takeda .......................... 370/401 |
| 2007/0078986 | A1 * | 4/2007 | Ethier et al. .................. 709/227 |

(Continued)

FOREIGN PATENT DOCUMENTS

WO   WO 2008/075892   6/2008

*Primary Examiner* — Alpus H Hsu
*Assistant Examiner* — Yee Lam
(74) *Attorney, Agent, or Firm* — Knobbe Martens Olson & Bear LLP

(57) ABSTRACT

A routing device includes means for executing a function of translation between at least one address of a first network and at least one address of a second network; means for receiving an association request from a terminal of said first network; means for generating a second request by substituting a source address in the association request by an address of the routing device in the second network; means for sending the second request to an address translation server of the second network; and means for sending said terminal, in response to said association request, a response received from said address translation server in response to sending said second request.

12 Claims, 2 Drawing Sheets

(56) References Cited

U.S. PATENT DOCUMENTS

| | | |
|---|---|---|
| 2007/0189311 A1* | 8/2007 | Kim et al. ............... 370/401 |
| 2007/0255784 A1* | 11/2007 | Takechi et al. ............ 709/203 |
| 2007/0271595 A1* | 11/2007 | Jin et al. ............... 726/3 |
| 2008/0019367 A1* | 1/2008 | Ito et al. ............... 370/392 |
| 2008/0117900 A1 | 5/2008 | Wang |
| 2008/0148378 A1* | 6/2008 | Wing et al. ............... 726/11 |
| 2009/0092132 A1* | 4/2009 | Fartmann et al. ............ 370/389 |
| 2009/0116499 A1* | 5/2009 | Kokado ............... 370/401 |
| 2009/0129301 A1* | 5/2009 | Belimpasakis ............ 370/310 |
| 2009/0323632 A1* | 12/2009 | Nix ............... 370/331 |
| 2010/0165993 A1* | 7/2010 | Basilier ............ 370/395.53 |

* cited by examiner

| 15 | INT ADD (RLD) | EXT ADD (AN) |
|---|---|---|
| | 172.0.0.10:5050 | 192.168.1.10:5050 |
| | 172.0.0.11:5050 | 192.168.1.10:5052 |

| 16 | INT ADD (AN) | EXT ADD (IPN) |
|---|---|---|
| | 192.168.1.1:5050 | 81.1.2.3:5050 |
| | 192.168.1.1:5052 | 81.1.2.3:5052 |

ROUTING DEVICE AND METHOD OF TRANSLATING ADDRESSES IN CASCADE IN A NETWORK

RELATED APPLICATION

This application claims the priority of French application no. 08/56543 filed Sep. 30, 2008, the entire content of which is hereby incorporated by reference.

BACKGROUND OF THE INVENTION

The field of the present invention is that of routing and more particularly that of address translation mechanisms used in telecommunications networks.

Network address translation (NAT) mechanisms or functions are conventionally used by home gateways to translate private addresses of the home network into public addresses of the Internet and vice-versa.

At present, the protocol on which the Internet is based is the Internet Protocol version 4 (IPv4) described in the document RFC 791.

This protocol uses an IP address on 32 bits, which is limiting expansion of the Internet.

This limitation is driving the transition from IPv4 to IPv6 (Internet Protocol version 6), the addresses of which are on 128 bits.

The deployment of IPv6 being relatively slow in practice, the present invention aims at an alternative solution to IPv6 to respond to the problem of the lack of IPv4 addresses.

Of course, the present invention is not limited to IPv4 and could be used in the context of IPv6.

Moreover, it is known that many services (peer to peer file sharing, voice over IP, etc.) require the setting up of incoming connections, i.e. connections from the Internet to the home network.

A constraint set for the present invention is that it should be able to accept such services.

OBJECT AND SUMMARY OF THE INVENTION

A first aspect of the invention is directed to a routing device including:
  means for executing a function of translation between at least one address of a first network and at least one address of a second network;
  means for receiving an association request from a terminal of the first network;
  means for generating a second request by substituting a source address in the association request by an address of the routing device in the second network;
  means for sending the second request to an address translation server of the second network; and
  means for sending the terminal, in response to the association request, a response received from the address translation server in response to sending the second request.

Another aspect of the invention is directed to a routing method of executing a function of translation between at least one address of a first network and at least one address of a second network, this method including:
  a step of receiving an association request from a terminal of the first network;
  a step of generating a second request by substituting a source address in the association request by an address of the routing device in the second network;
  a step of sending the second request to an address translation server of the second network; and
  a step of sending the terminal, in response to the association request, a response received from the address translation server in response to sending the second request.

In the present document, an "association request" is a request for associating an (internal address, port) pair with an (external address, port) pair, as is usual in address translation mechanisms, this association being used for incoming connections, i.e. connections from the second network toward the first network.

In one particular embodiment of the invention, the routing device and/or method of the invention is implemented in a home gateway.

One particular embodiment of the invention economizes on IPv4 addressing space by cascading the NAT functions, assigning an IPv4 private address to the home gateway, the NAT function of the home gateway being located behind another NAT equipment, for example of the Internet service provider.

In the current state of the art, it is usual to assign an IPv4 public address to home gateways. In this particular embodiment of the invention, a single IPv4 public address can service several hundred end users.

To implement the invention, the routing device receiving an association enquiry should substitute the source address in the request by its own address before sending it to the higher stage NAT server, failing which that server would block any incoming request.

Accordingly, by means of the invention, an association request coming from a terminal of the home network reaching the home gateway and relayed to the Internet address translation server after source address substitution enables responses generated by the address translation server to be sent back to the terminal.

The invention can be implemented with a cascade with two levels.

The routing device of the invention can be implemented to constitute a cascade with more than two stages.

In one particular embodiment of the invention, the means for generating the second request are adapted to select and to insert into the second request a monitoring port of the routing device available at the interface of the second network.

This feature advantageously avoids conflicts that could occur if two terminals of the first network were to send an association request to the routing device of the invention.

In one particular embodiment of the invention, the routing device includes a UPnP stack including:
  the means for receiving the association request;
  the means for generating and sending the second request to the address translation server; and
  the means for receiving a response from these servers and sending it to the terminal.

This aspect of the invention proposes to extend the Universal Plug and Play Internet Gateway Device (UPnP-IGD) protocol to support a NAT cascade, enabling the customer to retain a quality of service equivalent to that they have at present.

It should be noted that none of the known NAT traversal solutions (tunnels, STUN: simple traversal of UDPT through NAT, TURN: traversal using relay NAT, UPnP-IGD) can cascade a plurality of NAT.

The invention can be implemented using a protocol other than UPnP, and in particular using the NAT Port Mapping Protocol (NAT-PMP) described in the document "NAT Port Mapping Protocol (NAT-PMP)", draft-cheshire-nat-pmp-03.txt, Stuart Cheshire et al., 16 Apr. 2008.

In one particular embodiment, the steps of the routing method are determined by computer program instructions.

Another aspect of the invention is directed to a computer program on an information medium adapted to be executed in a routing device or more generally in a computer and including instructions adapted to execute the steps of a routing method as described above.

This program can use any programming language and take the form of source code, object code or a code intermediate between source code and object code, such as a partly compiled form, or any other desirable form.

Another aspect of the invention is directed to a computer-readable information medium containing instructions of a computer program as referred to above.

The information medium can be any entity or device capable of storing the program. For example, the medium can include storage means, such as a ROM, for example a CD ROM or a micro-electronic circuit ROM, or magnetic storage means, for example a floppy disk or a hard disk.

Moreover, the information medium can be a transmissible medium such as an electrical or optical signal, which can be routed via an electrical or optical cable, by radio or by other means. The program of the invention can in particular be downloaded over an Internet-type network.

Alternatively, the information medium can be an integrated circuit incorporating the program, the circuit being adapted to execute the method in question or to be used in its execution.

BRIEF DESCRIPTION OF THE DRAWINGS

Other features and advantages of the present invention emerge from the following description with reference to the appended drawings that show one non-limiting embodiment of the invention. In the figures.

DETAILED DESCRIPTION OF ONE EMBODIMENT

Figure 1:
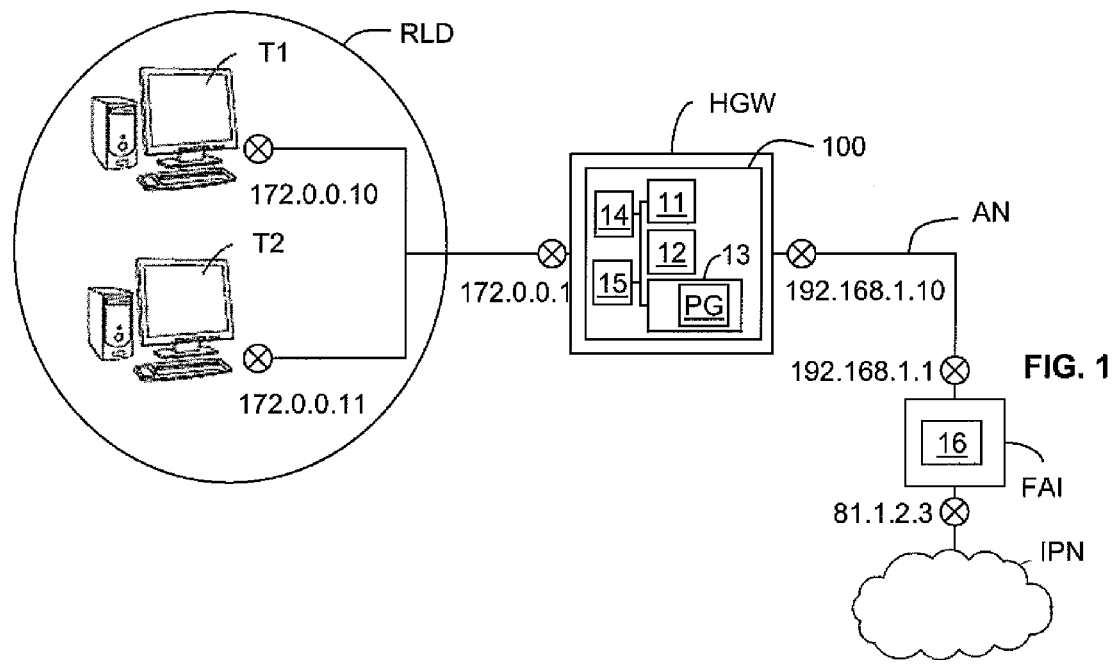
FIG. 1 represents, in its environment, a home gateway conforming to one particular embodiment of the invention.

FIG. 1 represents, in its environment, a home gateway HGW that conforms to one particular embodiment of the invention.

This gateway HGW includes a routing device 100 that conforms to one particular embodiment of the invention.

In the example described here, the home gateway HGW constitutes the interface between a home local area network RLD and an access network AN.

FIG. 1 also shows an address translation server FAI used by a service provider that is located between the access network AN and a backbone of the Internet protocol network IPN.

In the example described here, the home local area network RLD includes two terminals T1 and T2 that are connected to the home gateway HGW.

In the embodiment described here, the routing device 100 of the invention has the hardware architecture of a computer. It includes a processor 11, a random-access memory (RAM) 12, a read-only memory (ROM) 13, and communication means 14.

Figures 3, 4, 5:
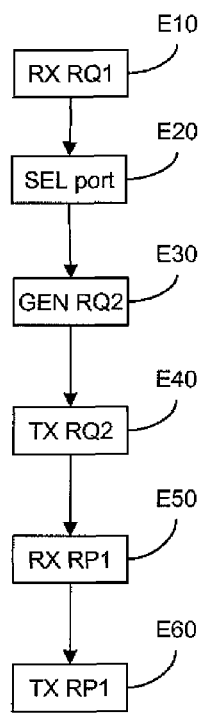
FIG. 3 represents, in flowchart form, the main steps of a routing method of one particular embodiment of the invention.
FIGS. 4 and 5 represent diagrammatically address translation tables relating to FIG. 1.

It also contains an address translation table 15, which is shown in FIG. 4.

The read-only memory 13 constitutes a storage medium of the invention for storing a computer program PG including instructions for executing the steps of a routing method of the invention that is represented diagrammatically in flowchart form in FIG. 3.

The operation of the home gateway HGW when it receives two successive association requests RQ1, RQ3 coming respectively from the terminal T1 and then the terminal T2 is described below with reference to FIGS. 2 and 3.

It is assumed that the terminal T1 has the private Internet address 172.0.0.10 in the home local area network RLD (@T1 in FIG. 1) and that it is seeking to monitor at its port 5050 incoming connections coming from the port 5050 of any IP address.

This association request RQ1 is received by the routing device 100 of the invention during a step E10 of the routing method of the invention.

On reception of this request RQ1, the routing device 100 selects an available monitoring port $P_{100}$, in this instance the port 5050, during a step E20.

Then, during a step E30, it generates a second request RQ2 in which it replaces the source (address, port) pair in the request RQ1 with the pair (@100, $P_{100}$) in which:

@100 is the IP address 192.168.1.10 of the routing device 100 in the network AN; and $P_{100}$ is the available port 5050 selected in the step E20.

The routing device 100 of the invention sends the request RQ2 to the address translation server FAI during a step E40.

It is assumed in this example that the port 5050 of the server FAI is free and that the server responds to the request RQ2 by sending a response message RP1 that is received by the routing device 100 during a step E50.

According to the invention, the routing device 100 sends this response message RP1 to the terminal T1 during a step E60 without modifying it.

Following the requests RQ1, RQ2 (which generate the response RP1):

the terminal T1 (172.0.0.10) monitors incoming connections to the port 5050;

the home gateway HGW monitors incoming connections to the port 5050 at its external interface (192.168.1.10); and the address server FAI with the IPv4 external public address 81.1.2.3 monitors incoming connection requests at the port 5050; if such a connection request reaches it, it executes the request and relays the connection to the external interface 192.168.1.10 of the gateway HGW at the port 5050; in turn, the gateway forwards the request to the terminal T1 of the home local area network, i.e. to the address 172.0.0.10:5050.

Assume now that the terminal T2 sends an association request RQ3, i.e. that it starts to wait for connections to the address 172.0.0.11, port 5050.

This request reaches the home gateway HGW, which effects address substitution (E30) and then relays the request (E40, request RQ4) to the FAI server to inform it that it is awaiting connections from the Internet to the address 192.168.1.10, port 5052.

As the port 5050 is already monitored on the external interface of the gateway following the execution of the request RQ1, the gateway HGW is obliged to choose another.

In this example, the request RQ4 received by the server FAI is then of the form {192.168,1.10, 5052, *, 5052}.

The server FAI therefore receives the request RQ4, processes it and sends the response RP2={81.1.2.3, 5052, OK} to the gateway HGW, which receives this response RP2 (step E50) and merely forwards it to the terminal T2 (step E60).

Of course, if the server FAI had detected that the port 5052 was already monitoring, it would have sent a response {81.1.2.3, 5054, OK} applying the parity rule of the port allocated.

Note that the behavior of the terminals T1 and T2 is unchanged, these terminals monitoring the same port in the local area network RLD.

However, by means of the invention, requests coming from the Internet Protocol network IPN are routed to the correct terminals. Connecting from the Internet Protocol network IPN to the address 81.2.3:5050 reaches the terminal T1 and connecting to the address 81.2.3:5052 reaches the terminal T2.

It is preferable for the terminals T1 and T2 to receive the responses RP1 and RP2 to their respective requests RQ1, RQ2 to be able to publish them externally.

For example, if the terminal T2 incorporates a web server, it will communicate the address/port pair (81.1.2.3, 5052) so that the web clients of the Internet Protocol network IPN can access it.

Figure 2:
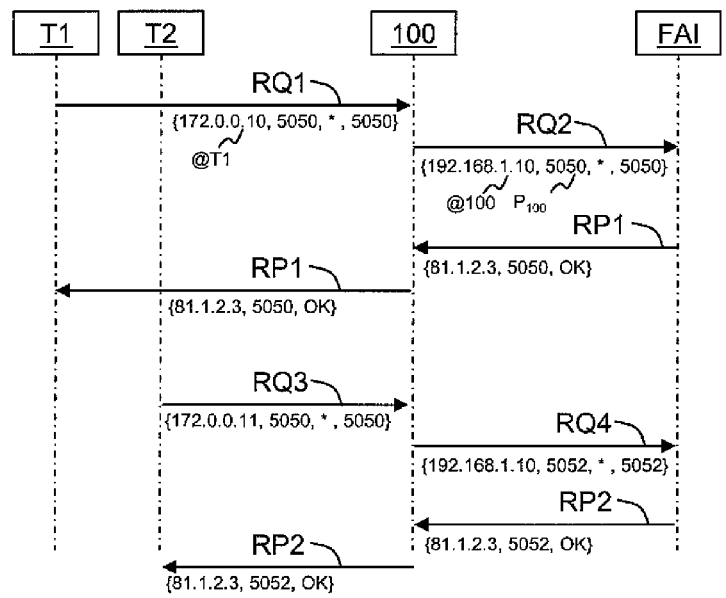
FIG. 2 represents control messages that can be used in one particular embodiment of the invention.

FIGS. 4 and 5 respectively show address translation tables 15 and 16 of the routing device 100 of the invention and the address translation server FAI following the exchange of control messages shown in FIG. 2.

Thus if a web client of the Internet Protocol network IPN is seeking to access the web server of the terminal T2, it sends a request to the address 81.1.2.3:5052, which is translated by the server FAI into the address 192.168.1.1:5052.

The request is then received by the routing device 100 and forwarded to its port 5050.

It will therefore be received by the terminal T2 at its port 5050, as requested in its association request RQ3.

What is claimed is:

1. A routing device for translating addresses in cascade between a first network, a second network, and a third network;
   the first network comprising at least a first terminal comprising a first pair of a first source address and a first port number, the first network coupling the at least one terminal to the routing device, the routing device comprising a second pair comprising a second address and a second port number;
   the second network coupling the routing device to an address translation server, the address translation server comprising a third pair comprising a third address and a third port number; and
   the third network being coupled to the address translation server so that the at least one terminal may communicate with the third network;
   the routing device comprising:
      an execution unit for executing a function of translation between at least the first source address of the first network and at least the second address of the second network;
      a first receiving unit for receiving a first association request comprising the first pair and coming from the first terminal of said first network;
      a generating unit for generating a second association request by substituting at least said first source address in said first association request by at least the second address, through the action of the execution unit;
      a first sending unit for sending the second association request to the third address of the address translation server;
      a second receiving unit for receiving a first response comprising the third pair from the address translation server in response to sending the second association request;
      a second sending unit for sending the first response comprising the third pair to the first terminal; and
      a Universal Plug and Play (UPnP) stack comprising:
      said first receiving unit for receiving the association request;
      said generating unit for generating said second request and said first sending unit for sending said second request; and
      said second receiving unit for receiving said first response and said second sending unit for sending said first response.

2. The routing device according to claim 1, wherein said generating unit for generating said second request is adapted to select and to insert into the second request a monitoring port of said routing device available at an interface of said second network.

3. A home gateway including the routing device according to claim 1.

4. The routing device according to claim 1, wherein said address translation server is an address translation server of an internet service provider located between the access network and an Internet Protocol Network.

5. The routing device according to claim 1, wherein said second network is an access network and wherein said third network is an IP network.

6. The routing device according to claim 1, wherein the first network further comprises a second terminal comprising a fourth pair of a fourth source address and a fourth port number, and wherein:
   the execution unit is further configured to execute a function of translation between at least the fourth source address of the first network and at least the second address of the second network;
   the first receiving unit is further configured to receive a third association request comprising the fourth pair and coming from the second terminal of the first network;
   the generating unit is further configured to generate a fourth association request by substituting at least the fourth source address in the third association request by at least the second address, by means of the execution unit;
   the first sending unit is further configured to send the fourth association request to the third address of the address translation server;
   the second receiving unit is further configured to receive a second response comprising the third pair from the address translation server in response to sending the fourth association request; and
   the second sending unit is further configured to send the second response comprising the third pair to the second terminal.

7. The routing device according to claim 6, wherein the generating unit is further configured to generate said fourth association request by also substituting the fourth port number by a fifth port number of the routing device, when the second port number is already being monitored.

8. The routing device of claim 1, wherein the Universal Plug and Play Internet Gateway Device (UPnP-IGD) protocol is extended to support a Network Address Translation (NAT) cascade.

9. A routing method of translating addresses in cascade between a first network, a second network, and a third network;

the first network comprising at least a first terminal comprising a first pair of a first source address and a first port number, the first network coupling the at least one terminal to the routing device, the routing device comprising a second pair comprising a second address and a second port number;

the second network coupling the routing device to an address translation server, the address translation server comprising a third pair comprising a third address and a third port number; and the third network being coupled to the address translation server so that the at least one terminal may communicate with the third network;

said method being executed by a routing device adapted to execute a function of translation between addresses of the networks, wherein the method comprises:

receiving by a Universal Plug and Play (UPnP) stack a first association request comprising the first pair and coming from the first terminal of said first network;

generating a second association request by said Universal Plug and Play stack by substituting at least the first source address in said first association request by at least the second address by executing a function of translation between at least the first address of the first network and at least the second address of the second network;

sending by said Universal Plug and Play stack the second association request to the third address of the address translation server;

receiving by said Universal Plug and Play stack a first response comprising the third pair from the address translation server in response to sending the second association request; and sending the first response comprising the third pair to the first terminal by said Universal Plug and Play stack.

10. A non-transitory computer-readable medium storing one or more sequences of instructions which, when executed by a processor, causes the processor to execute the routing method according to claim 9.

11. A non-transitory computer-readable storage medium storing a computer program including instructions for executing the routing method according to claim 9.

12. The routing method according to claim 9, wherein said method is performed by a computer comprising instructions for performing said method stored thereon.

* * * * *